June 5, 1956 H. L. DANIELS 2,749,533

SEQUENCE DISCRIMINATOR SYSTEM FOR LOCATING INFORMATION

Filed May 23, 1950 3 Sheets-Sheet 1

INVENTOR
Howard L. Daniels

BY Cushman, Darby & Cushman
ATTORNEYS

SEQUENCE DISCRIMINATOR SYSTEM FOR LOCATING INFORMATION

Filed May 23, 1950 3 Sheets-Sheet 2

INVENTOR
Howard L. Daniels

BY Cushman, Darby & Cushman
ATTORNEYS

June 5, 1956 H. L. DANIELS 2,749,533

SEQUENCE DISCRIMINATOR SYSTEM FOR LOCATING INFORMATION

Filed May 23, 1950 3 Sheets-Sheet 3

INVENTOR
Howard L. Daniels

BY Cushman, Darby & Cushman
ATTORNEYS

United States Patent Office 2,749,533

Patented June 5, 1956

2,749,533

SEQUENCE DISCRIMINATOR SYSTEM FOR LOCATING INFORMATION

Howard L. Daniels, St. Paul, Minn., assignor, by mesne assignments, to Sperry Rand Corporation, New York, N. Y., a corporation of New York Application May 23, 1950, Serial No. 163,724

8 Claims. (Cl. 340—147)

This invention relates to a method and apparatus for the automatic selection of items which have been previously recorded.

Many advances have recently been developed in the recordation of information, particularly in the field of film storage and magnetic storage. Once stored, however, predetermined items must be readily available, and systems must be devised to provide for the selection process.

My invention herein described provides a method and system for locating given sections of information bearing records such as films, paper tape, magnetic tape and the like. The invention will be described mainly with reference to film for sake of clarity, but the application of my techniques to other mediums will be apparent.

Previous selection devices, as exemplified by those disclosed in applications for U. S. Letters Patent by Vannevar Bush No. 170,456 of October 22, 1937, and No. 363,942, filed November 1, 1940, both now abandoned; U. S. Patent No. 2,251,998, issued August 12, 1941, to C. J. Goodale and Publication PB 97,535 of the Office of Technical Services, U. S. Department of Commerce, Washington 25, D. C., and page 122 of the September 1949 issue of Electronics all suffer from the common failing that it is necessary to reserve on the film or other record a portion to contain the code marks, and/or elaborate fault-prevention techniques, so that the written or other material associated with the dot coding never interferes with the operaion of the photoelectric scanning system. Stated otherwise, the film is split lengthwise into two bands, one of which is reserved exclusively for dot coding and the other of which is reserved exclusively for the written or other material from which selection is to be made, or if code dots appear in a path also containing information, additional equipment is necessary to prevent misfires.

It is the primary objective of this invention to provide a means for discriminating between coded indicia and random patterns generated by written material while employing a record in which the coded indicia and the written material occupy the same portions of the film gate as the record is moved beneath a scanning device. Stated otherwise, this invention does not require that areas on a film, for example, in the nature of separate portions across the same, be reserved for the coding indicia and for the written material or pictures. Further by way of explanation, photoelectric cells are arranged to "watch" essentially the entire width of the microfilm, and during part of the time they may be watching coded indicia to which they should be responsive and part of the time they may be watching the random configuration of the written material to which they should not be responsive. The hereinafter described system and apparatus provides the means for eliminating response to such random patterns while still assuring that the photocell will effect proper discrimination between desired and undesired indicia, all in cooperation with the film having no areas widthwise reserved exclusively for selection.

It is a corollary objective of the foregoing to provide a system for accomplishing the primary objective which will permit the original indicia to be recorded on the microfilm by the same automatic equipment as that used for recording the written material or pictures. This automatic apparatus usually comprises an automatic feed for the documents to be recorded and it is contemplated in its corollary objective that this same means will be employed to record the coded indicia, for example, by inserting a card bearing black and white areas, as hereinafter more fully described, corresponding to the index which is to be assigned to a given amount of written material or pictures. The previously cited patents and applications do not completely fulfill this objective insofar as they require an auxiliary "target" comprising a light bank or movable sliders, etc., in addition to the apparatus required for recording the written material or pictures.

It is a further objective of this invention to provide a photoelectric system for effecting the necessary selection with a very high degree of reliability, even though the coded indicia on the microfilm may suffer from considerable photographic degradation. The apparatus of the present invention is able to operate in a satisfactory manner even though the nominally opaque areas transmit as much as 10% and even though the nominally clear areas transmit as little as 70% of the incident light.

It is a further objective of this invention to provide a circuit comprising a chain of electronic apparatus which operates on a sequential basis to recognize desired signals with a high degree of discrimination against either undesired signals or purely random signals, the latter arising from the scanning of written material rather than dot patterns.

A further object is to provide a circuit arrangement for producing an output signal only when a plurality of input signals have occurred in a predetermined sequence.

Other objectives and advantages of the invention will be apparent to those skilled in the art from the following description and drawings, although it must be understood that the details of such description and drawings are not intended to limit the invention. The true scope of my invention is set forth in the appended claims.

In the drawings:

Figure 9 shows the placement of a code area on a film bearing recorded bank checks or the like.

Figure 1:
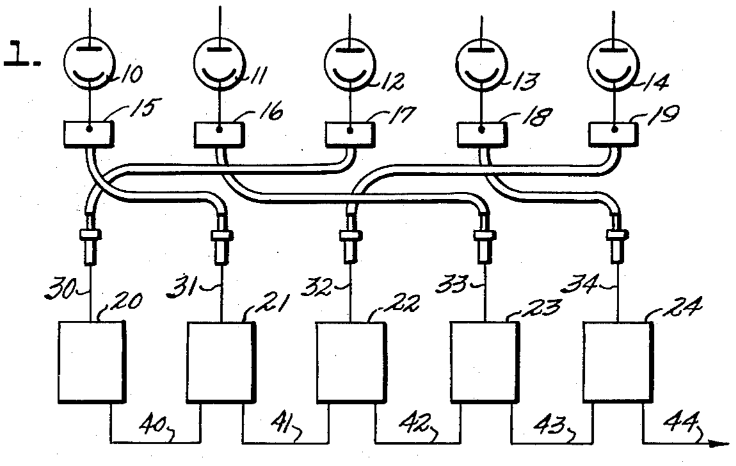
Figure 1 shows a diagrammatic layout of one embodiment of the present invention.
Figure 2:
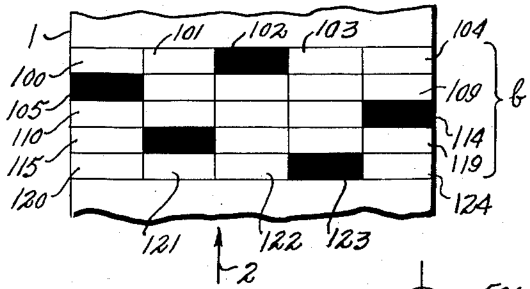
Figure 2 shows the type of microfilm code area which cooperates with the system of Figure 1.

Referring first to Figures 1 and 2, these show a possible coding system and associated electronic code recognizing apparatus, arranged so as to discriminate reliably one of 120 possible combinations, and which furthermore may distinguish the one so commanded from all other signals arising fortuitously from random material which may also be viewed by the photocells.

The particular case illustrated in Figures 1 and 2 utilizes five photoelectrical cells and cooperating with these on a microfilm 1 is a code area comprising five rows running down the length of the film and five columns running across the film. This area is embraced by bracket *b* and contains areas 100 to 124. This code area is always utilized in such a way that, in each row and in each column, there is one and only one area which is rendered opaque, the remainder being freely transmitting. The converse, however, may also be employed. It will be readily understood that this scheme will permit $5 \times 4 \times 3 \times 2 \times 1$ or 120 possible combinations, any or all of which may be used for coding purposes. It is also apparent that a greater number of coding possibilities may be achieved by the simple expedient of using more rows, columns and photocells; for example, six of each would provide 720 combinations, whereas seven of each would provide over 5000 combinations.

The system described uses so-called "binary" marks: That is, an area is either in one state or the opposite state.

As schematically indicated in Figures 1 and 2, the five photocells 10, 11, 12, 13, and 14 are so disposed that (in cooperation with associated light focusing optics which are well-known and not the subject of this invention) they effectively watch a single row across the width of the film 1 which is moving lengthwise in direction of arrow 2. The "watching" may, in fact, be of less than the entire width, depending on the precision of the equipment employed and the actual width of the film. Stated otherwise, at a first instant of time these five photocells are watching the areas 100, 101, 102, 103 and 104, which means that only photocell 12 is obscured from the light source by the intervention of the opaque spot 102 carried by film 1. Attached to the five photocells are five amplifiers 15, 16, 17, 18 and 19 arranged as shown. In accordance with well-known electronic practices, these amplifiers are arranged so as to produce an output signal only when the associated photocell is darkened; hence, only amplifier 17 is capable of producing an output signal when the cells are "watching" spots 100 to 104. Examination of the layout of Figures 1 and 2 will show that, when the film 1 has moved a short distance, the five photocells will be watching the area comprising 105, 106, 107, 108 and 109 and of these five, only 105 is blackened and hence only photocell 10 and amplifier 15 will produce any output signal. By similar line of reasoning, opaque area 114 of the group comprising 110 to 114 will actuate photocell 14 and amplifier 19 following which amplifier 16 will give a signal at the next instant of time and amplifier 18 will give a final signal when the group comprising 120 to 124 move past the photocells.

It will be understood that any light sensitive means may be used to replace the photocells.

Thus, it will be seen that, as the pattern of Figure 2 moves past the five photocells, it will cause each of these photocells to give out a single output signal and that these signals will follow one after the other, although not ordinarily in the same order as the numerical order of the photocells; in the cited example, the actual order is 12, 10, 14, 11, 13. It is also clear at this point that a random array of signals which might arise from the passage of written material or pictures would be extremely unlikely to produce a set of patterns which would enable the photocells to produce this particular type of output signal.

To utilize the foregoing signals, electronic apparatus is provided which is capable of detecting when the output signals from the photocell-amplifiers are produced in a desired sequential manner. If the signals are produced in the desired sequential manner, then the electronic apparatus is called upon to furnish an output signal which may be used for a variety of purposes, such as stopping the firm, backing it up, or causing a photographic reproduction thereof.

Suitable electronic circuits are generally described in the immediately following paragraphs. These circuits are further described in detail in a later part of this specification.

The boxes 20, 21, 22, 23, and 24 schematically illustrate what is generally known in the electronic art as "one-shot multivibrators." For the moment, these may each be described as electronic apparatus which have the property of existing in one of two binary states, one of which is metastable and may be considered as the rest condition, the other one of which is only momentarily stable so that it tends to revert to the original metastable or rest condition. These two states will be hereinafter referred to as the rest condition and the active condition, it being remembered that the device is capable of remaining in the active condition only for a predetermined time, after which it reverts to its normal or rest condition. Examining now only the first one-shot multivibrator (20) it will be seen that this unit has but one input circuit (30) and one output circuit (40). As is more fully explained hereinafter, the arrival of an input signal through input line 30 causes multivibrator 20 to shift from its metastable rest condition, a controllable time after which it automatically resumes its rest condition, but while in the active condition it produces as output signal over lead 40.

In summary, the arrival of an input signal on lead 30 produces an output signal of fixed duration on lead 40. The duration of the output signal at 40 is independent of the duration of the input signal at 30 and may be made anything that is desired for the purposes of this invention.

Multivibrator 21 is similar to multivibrator 20 except that it comprises two input leads, one of which is the lead 31 from a photocell and the other one of which is the previously mentioned lead 40 which is also the output of multivibrator 20. Multivibrator 21 functions in a similar manner except that, in order for it to provide an output signal at lead 41, it is necessary that input signals be present simultaneously on leads 31 and 40. These may be termed primary and secondary inputs, respectively. It is to be understood that the duration of the signal on 31 and the duration of the signal on 40 very likely are unequal; all that multivibrator 21 is required to do is produce an output signal on lead 41 if, at any instant of time no matter how brief, there is a signal simultaneously present on both 31 and 40. The remainder of the chain (multivibrators 22, 23 and 24) is similar in all respects to multivibrator 21. Stated otherwise, except in the case of the first multivibrator 20, primary input signals arriving over the leads 31, 32, 34 may trip their associated multivibrators 21, 22, 23, 24 only if there is simultaneously present at the appropriate associated other input terminal a secondary or "enabling" signal derived from the output of the previous multivibrator. Thus, if the photocells are obscured in the proper order and only in this proper order and at a rate within a predetermined range, then a signal will traverse the entire chain of multivibrators 20, 21, 22, 23 and 24 via the enabling signal leads 40, 41, 42 and 43 so that an output may result on lead 44. As mentioned previously, this output signal may be used for a variety of purposes which are not the subject of the present invention.

In Figure 1 are shown a number of leads connecting the output of amplifiers 15, 16, 17, 18 and 19 to the input leads 30, 31, 32, 33 and 34; it will be noted that these are generally not in a "straight through" order but are arranged in the manner of a plug board so that there is a "scramble" relationship. In each case, the output of an amplifier may go to one and only one multivibrator input. Under this limitation, the first amplifier might be plugged to any of the five multivibrator inputs, the second might be plugged to any of the remaining four, the third might be plugged to any of the remaining three, etc. Thus, the total number of combinations of this plugging is, once again, $5 \times 4 \times 3 \times 2 \times 1$, or 120. As mentioned previously, the actual order of signals from the photocells is 12, 10, 14, 11, 13 in the example shown in Figure 2. For the plugging shown in Figure 1, it is clear that the actual order of signals cited, in cooperation with this plugging, will cause the multivibrator input leads to be signalled in succession or in the order 30, 31, 32, 33, 34. The first of these, arriving from photocell 12, amplifier 17, and the input lead 30, will cause multivibrator 20 to produce an output signal over lead 40. This in turn will "enable" multivibrator 21, and at the same time, a signal from photocell 10, amplifier 15, and the multivibrator input 31, will trigger multivibrator 21, thereby producing an output signal over lead 41 which will suffice to "enable" the next multivibrator 22. In a similar manner, the signal will proceed down the chain of multivibrators until an output signal is produced on lead 44.

The arrangement here illustrated produces a high degree of discrimination against random printed material or pictures which may be viewed from time to time by the photocells. Stated otherwise, it is extremely unlikely that anything other than the correct pattern as deliberately produced on the original film can actuate the system and produce an output signal. Patterns other than the desired one may actuate a number of the photocells and multivibrator inputs but, if the pattern does not correspond to the plugging between the amplifier outputs and the multivibrator inputs, then these multivibrators will not be signalled in the proper order and at the proper times; hence, a signal may proceed part way down the chain of multivibrators but in no event could it proceed the whole distance to the output lead 44.

If the particular information recorded on the film 1 should be such that substantially straight lines appear across the film in a direction coinciding with the watching photocells 10–14, all of the amplifiers 15–19 would be simultaneously energized on primary and secondary inputs and an output signal produced. Such an occurrence may be avoided, however, if the multivibrators 20–24 are so arranged that they do not change their state until a delay period after the primary input pulse is received. By this means, an arrangement may be had wherein a simultaneous energization of amplifiers 15–19 will not produce an output signal at lead 44.

Figure 4:
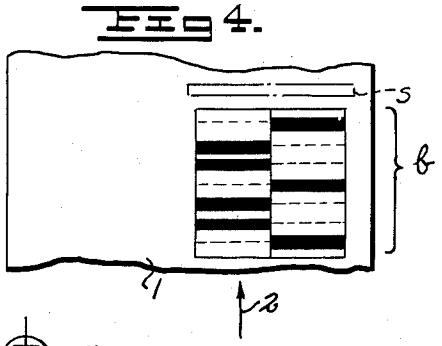
Figure 4 shows the type of microfilm code area which cooperates with the apparatus of Figure 3.
Figure 3:
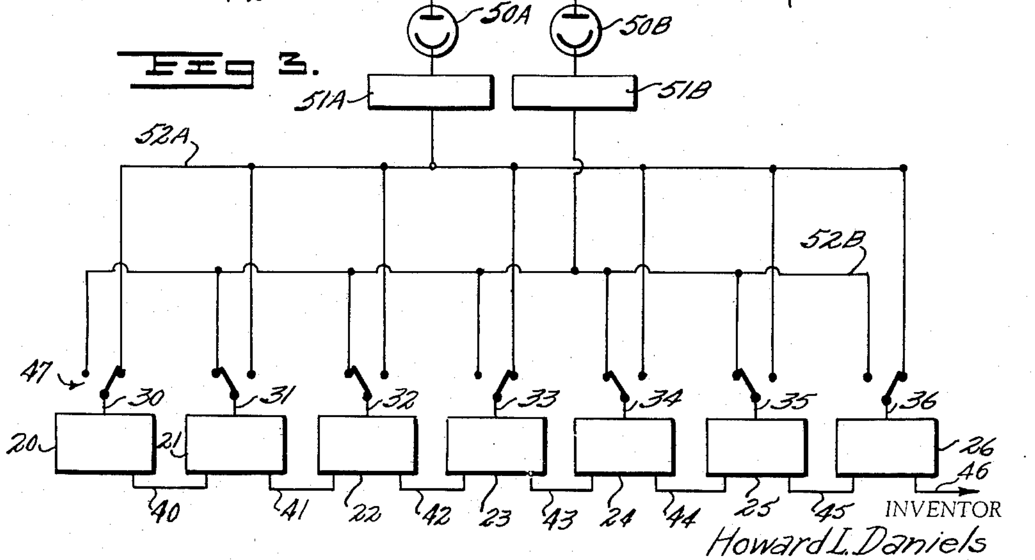
Figure 3 shows another and generally preferred embodiment of the present invention.

Referring now to Figures 3 and 4, these show an alternative and generally preferred coding system and associated electronic code recognizing apparatus, arranged (in the particular example hereinafter set forth) so as to discriminate reliably one from 128 possible combinations and which similarly distinguish the one so commanded from all other signals arising fortuitously from random written material or pictures which may also be viewed by the photocells. The particular case illustrated in Figures 3 and 4 utilizes but two photocells and cooperating with these on the microfilm is a code area comprising two columns widthwise of the film each of which is divided into seven rows down the length of the film, thereby forming a total of fourteen elementary areas which may be considered as comprising seven pairs. The arrangement of the microfilm is such that, in each of the seven pairs, one of the areas is darkened or rendered opaque whereas the other is left freely transmitting. Thus, as this film goes past a scanning slit *s* schematically illustrated in Figure 4, then one or the other of the two photocells 50A or 50B will "go dark." It is also equally clear that there will never be any occasion (during the passage of a bona fide code pattern) when neither 50A nor 50B go dark nor will there ever be any occasion when they both go dark. In other words, the side-by-side areas are truly "binary," being either in one state or another. There being seven such pairs of areas, it is clear that the total number of combinations possible is $2^7$ or 128; it is equally clear that be providing more pairs to operate in the aforementioned fashion, the total number of combinations could be increased; for example, twelve pairs would provide over 4000 combinations.

The remaining portion of the discriminating system can be seen with reference to the remainder of Figure 3. Signals on the previously mentioned photocells 50A and 50B are amplified in a conventional manner by amplifiers 51A and 51B and the output pulses therefrom are made available at busses 52A and 52B. A chain of one shot multivibrators in all respects similar to the one previously described in connection with Figure 1 will be seen in Figure 3 and is similarly labeled 20, 21, 22, 23, 24, 25 and 26, the multivibrators themselves being interconnected by leads 40, 41, 42, 43, 44 and 45 with the output signal in this case being rendered available at lead 46. The other inputs to the top sides of the multivibrator units are schematically shown by leads 30, 31, 32, 33, 34, 35 and 36; these are selectively connected, each to one of the two busses 52A or 52B by means of simple two-position hand set switches 47. It is by means of these hand set switches that the desired code may be set up for the selection operation; it is also clear that the total number of such combinations in this example is again $2^7$ or 128. As in the case of the system disclosed in connection with Figure 1 the chain of multivibrators here operate in exactly the same manner. Stated otherwise, if there is agreement between the dot codings of Figure 4 and the switch settings of Figure 3, then it is possible for a signal to originate at the first multivibrator 20, thereby "enabling" multivibrator 21 at the same time as it receives an input signal over lead 31, similarly multivibrator 21 "enables" 22 at the same time that the latter receives an input signal over 32. This process continues down the entire chain until finally there appears at 46 an output signal which may be used for a variety of purposes which are not the subject of the present invention. On the other hand, random signals probably will fail to produce output signals from amplifiers 51A and 51B or, if they do, they certainly will not produce them in the right order over the busses 52A and 52B so that they are made available at the input leads 30–36 in the proper order to operate the chain of multivibrators. Thus, there is a very high probability that anything other than the proper pattern in Figure 4 will fail to produce an output signal over lead 46. Bars across the film will not produce an output signal because of delay in the multivibrators, as has been previously explained in connection with Figures 1 and 2.

Figure 9:
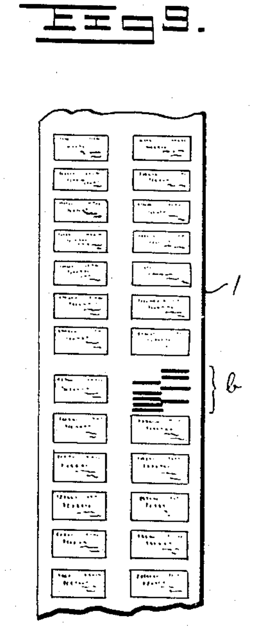

Figure 9 shows a length of the film 1 bearing recorded information together with a code area of the type of Figures 3 and 4. The code of Figure 2 could replace this.

Figure 5:
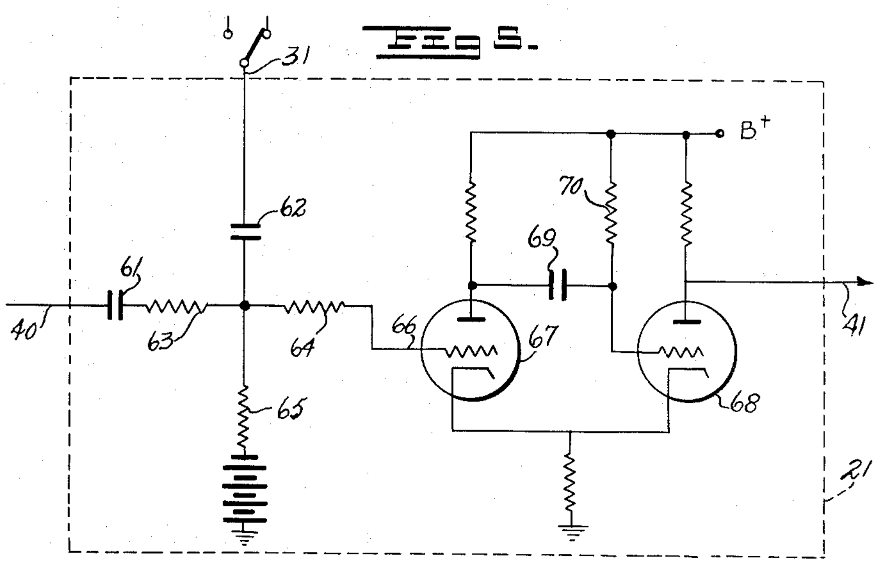
Figure 5 shows one unit of the electronic apparatus which is fundamental to the apparatus shown in both Figure 1 and Figure 3.

To complete a description of my invention, reference is now made to Figure 5 which shows one of the units, such as block 21 of Figure 1 or Figure 3, previously referred to as a "one-shot multivibrator." This device is well-known to those skilled in the electronic art and is merely an extension of the rather classical "flip-flop" circuit of Eccles and Jordan. For further details of this particular modification, reference may be had to chapter 12 of "Radio Engineering" (1947) by Frederick E. Terman which describes the "one-shot multivibrator" and its mode of operation in considerable detail. Further reference may also be had to volume 19, chapter 5, of the "Radiation Laboratory Series" edited by L. N. Ridenour, published in 1949, which describes the same general type of apparatus (therein referred to as "monostable multivibrators"). The circuit of Figure 5 is a practical adaptation of the circuits described in the cited references, which adaptation is effective in the practice of the instant invention.

In greater detail, the diagram, in a typical case, represents the contents of the box schematically illustrated by the reference figure 21 in either Figure 1 or 3. It will be recalled that this box has three connections elsewhere, namely, lead 40 which supplies the "enable" signal from the preceding stage and lead 41 which supplies the "enable" or secondary signal to the next succeeding stage, and also lead 31 which receives the input or primary signal from the associated photoelectric cell amplifier. An input circuit comprising condensers 61 and 62 and resistors 63, 64 and 65 feeds the grid 66 of the first tube 67. Magnitudes of these condensers and resistors are so chosen that grid 66 receives a signal large enough to actuate tube 67 only when there is a signal simultaneously present on both input leads 31 and 40. Stated conversely, if an input signal appears only on lead 31 or only on lead 40, then this is insufficient to actuate the grid 66 of tube 67. However, if these input signals are simultaneously present (and even though they have different time durations but do exist simultaneously for an instant, no matter how brief) then grid 66 is effective to actuate tube 67. The latter, in connection with its companion tube 68 constitutes a "one-shot multivibrator" or "monostable multivibrator," the action of which is well-known in the art, but is briefly reviewed here as follows: Under quiescent conditions (i. e., in the metastable state) tube 68 carries a large plate current which causes the cathodes of both tubes to be considerably positive with respect to ground, thus causing tube 67 to be cut off. However, the large positive signal applied to grid 66 by the simultaneous occurrence of input signals on leads 31 and 40 initiates multivibrator action, in which the current is transferred to tube 67 while the grid of tube 68 is simultaneously driven negative so that the plate current of tube 68 is cut off. This condition persists until the charge on the condenser 69 is able to leak off through the rather high resistance 70 sufficiently to reduce the negative voltage on the grid of tube 68 to the point where this tube can again amplify. The plate current then switches back to tube 68 and the original condition is restored. Thus, the multivibrator may be said to exist in the momentarily stable condition (with 67 conducting and 68 cut off) for a short time, this time being primarily controlled by the magnitudes of the condenser 69 and the resistor 70. While in this momentarily stable condition, a positive output signal appears on terminal 41 and this may be used as the "enable" signal for the next multivibrator stage 22 as shown on either Figures 1 or 3. In summary, the unit shown in Figure 5 has the property of furnishing an output signal only when a photocell input signal and an "enable" signal are simultaneously present; whenever it does furnish such an output signal, it is of constant duration irrespective of the duration of the input signal. Thus it is possible to gang together these units which will have the desirable properties hereinbefore set forth in connection with Figures 1 and 3 for the purpose of discriminating between a desired dot code pattern and an undesired pattern or a random pattern associated with written material or pictures. The first circuit 20 may also be adapted to operate only when an additional external signal is present.

The aforementioned discrimination can be made particularly acute by the proper adjustment of circuit values. However, it will be found that the more rigidly such discrimination is made by such circuit adjustment, the more accurately the speed of the film in Figure 2 or 3 must be maintained. As a practical matter, it seems quite feasible to so adjust the circuit constants that the film speed may be permitted to vary over as much as a 2:1 range, and that even this broad speed tolerance will provide a more than adequate discrimination for most purposes. In order that persons skilled in the art may have a guide to assist them in adjusting the circuit constants of Figure 4 and the hereinafter described Figure 5 for their particular purposes, the following information is provided.

As previously explained, the time during which any multivibrator element (such as 21 in Figure 5) remains in its momentarily stable condition (with 67 conducting and 68 cut off) is determined by the time constant of the circuit comprising the condenser 69 and the resistor 70, this being a matter which is well-known to those skilled in the art. This in turn determines the length of time during which an "enabling signal" is available to the next succeeding multivibrator in the chain, and hence the longest time interval during which a second incoming signal may be successful in triggering off the succeeding multivibrator. This in turn determines the minimum film speed. Stated otherwise, if the film is driven at so slow a speed that the signals arrive at intervals greater than that called for by the aforementioned time constant of condenser 69 and resistor 70, then these signals will be unsuccessful in actuating the multivibrator chain in the manner previously described. Thus, if the film were to be driven at the proper speed and if fortuitous random signals happened to set up a pattern identical to the sought for code, but if these signals were slower than correct, then this fortuitous pattern would not serve to actuate the multivibrator chain. In summary, it may be observed that the time constant of condenser 69 and resistor 70 effectively determine the minimum speed at which signals may arrive and be accepted; this in turn effectively imposes a minimum speed requirement on the film drive.

As has been previously mentioned, an output pulse resulting from a simultaneous actuation of the photocell amplifiers may be avoided by creating such delay in each multivibrator that the signal from most of the amplifiers will decay before the secondary input is established. Another way of avoiding a simultaneous energization of the multivibrators by continuous lines in the information areas is to arrange the photocells to "watch" in a line running at an angle to the edge of the film. Under this system a widthwise bar will not actuate all the cells at the same time.

Figures 6A, 6B:
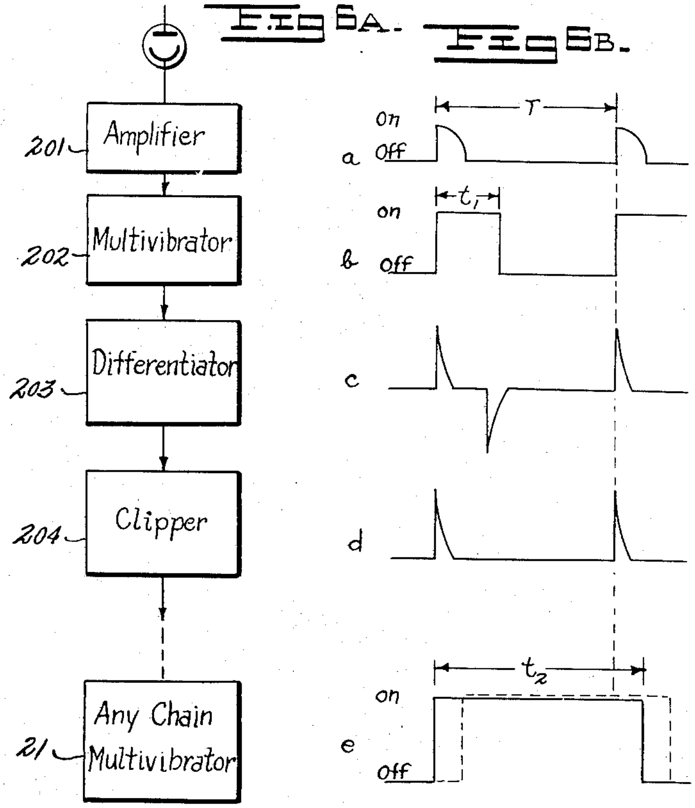
Figure 6A shows an additional electronic circuit used for increased discrimination.
Figure 6B shows wave forms present in the circuits of Figure 6A.

A number of methods may be used to control the maximum acceptance rate and therefore the maximum speed of the film. A preferred method for accomplishing this maximum speed control is illustrated in Figure 6A. This discloses a circuit 202 comprising a multivibrator of the type previously discussed in Figure 5, modified so as to have but one input similar to one which is the first of the chain shown in Figure 1 or Figure 3, which is followed in turn by a differentiator circuit 203 and a diode clipper 204, the whole being inserted either within the amplifiers 15, 16, 17, 18 and 19 of Figure 1 or the amplifiers 51A and 51B of Figure 3, in which case they may be considered to become part of said amplifiers, converting them to "pulse shaping amplifiers."

The action of the circuit schematically illustrated in Figure 6A is as follows: Incoming pulses from the photocell and conventional amplifier 201 are assumed to have a form approximately as illustrated in *a* of Figure 6B, although this form is not by any means necessary to the practice of this invention. Succeeding pulses are separated by time interval T (Fig. 6B) as illustrated, this being determined by the speed of the film and the spacing of the successive bars forming the film patterns of Figure 2 or Figure 4. As further illustrated in *b* of Figure 6B of the drawing, these pulses cause multivibrator 202 to switch from its "off" condition to its "on" condition, the latter being an unstable condition such that, after a time interval $t_1$, the multivibrator returns to its metastable or "off" condition. As previously explained, this multivibrator action produces essentially square waves having rather sharp rise and fall times. Such square waves are then fed into differentiator circuit 203 comprising effectively a small series condenser and a small shunt resistor, the effect of which is essentially to produce a wave which is the first time derivative of the square wave from the multivibrator (*c* of Figure 6B). As is well-known in the art, such a first derivative is only approximated in actual circuitry, the net result being the production of two pulses of quite short duration, the first being a positive pulse occurring at the time that the multivibrator switches from its "off" to its "on" condition and the second being a similar pulse of negative polarity occurring when the multivibrator resumes its "off" condition. Clipper 204 effectively eliminates the second or the negative of these pulses in a conventional manner (*d* of Figure 6B).

In summary, the signals going out over output leads 30—34 of Figure 1 or 52A and 52B of Figure 3 comprises essentially one sharp "spike" for each incoming photocell signal. Such a pulse is produced by the transition of the multivibrator 202 from its "off" to "on" condition. Obviously such an output pulse cannot be produced in the case of an incoming photocell signal which arrives at any time during which the multivibrator is already in the "on" condition since, if it is already in the "on" condition, there is no possible way for any transition to occur to produce an output signal. Stated otherwise, if two photoelectric signals arrive so closely together that the second reaches the multivibrator while it is still in the "on" condition (as a result of the arrival of the first signal) then the second will be ineffective in producing any output signal through the circuit as shown. In summary, the time interval between successive pulses (T) must be greater than the time interval ($t_1$) of the "on" condition of multivibrator 202. It is readily apparent that this determines the maximum film speed for effective operation of the discriminator in connection with a desired signal.

The relationship between the previously explained minimum and maximum speeds may be further illustrated graphically in connection with Figure 6B. The bottom wave form of this figure illustrates the action of any of the multivibrators previously described as constituting part of the chain of Figure 1 or Figure 3. These multivibrators can remain in the "on" condition for a time duration $t_2$ which, as previously explained, was determined by the time constant of condenser 69 and resistor 70 of Figure 5. Also, as previously explained, the next succeeding photocell pulse (if it is to be effective in actuating the next element in the chain) must arrive within a time interval T which is not greater than $t_2$ as otherwise the connecting enabling signal would have disappeared. Summarizing both the minimum and maximum speed requirements, $t_1$ is determined by the "recovery time" of the monostable multivibrator 202 and the time interval $t_2$ is determined by the "recovery time" of the monostable multivibrators in the chains of Figures 1 and 3, and it is necessary that the actual time interval T of the arriving or incoming photocell pulses remain between the limits $t_1$ and $t_2$ thereby established. Stated otherwise $t_1<T<t_2$, in order to operate the complete circuit.

The solid line in part *e* of Figure 6B shows a pulse established immediately upon the occurrence of the "spike" in *d* of Figure 6B. The dash line of *e* of Figure 6B, however, shows a pulse delayed until the "spike" has decayed, this delay being used when the nature of the recorded information may cause frequent simultaneous actuation of the photocell amplifiers.

Now it is obvious that $t_1$ and $t_2$ can be made almost any value within reason and that furthermore $t_1$ and $t_2$ can be made very nearly equal so that the maximum permissible excursions or variations in the value of T are very small. If this be done, it will be found that the circuit as a whole exercises an extremely high degree of discrimination as between the desired code patterns and the undesired code patterns or random patterns arising from the scanning of written material or pictures. It will also be found that such a rigid criterion for the permissible tolerances of T imposes very strict requirements on the constancy of speed of the film drive. The foregoing circuits have been built and tested under typical operating conditions and a reasonable compromise has been established between excessive discrimination and rigid speed tolerances on the one hand and more moderate discrimination and more moderate speed requirements on the other hand. A wide range has been explored and it has been found that a reasonable compromise may be effected making $t_1 \cong \frac{1}{2} t_2$. Stated otherwise, in a reasonable compromise the speed of the film may be permitted to vary over a range of 2:1 and it will be found that a very high degree of discrimination as between wanted code patterns and unwanted code patterns or fortuitous pattern results. For particular applications, desirable results may be obtained with $t_1 = \frac{1}{10} t_2$ (a 10:1 speed range). For other particular applications, it may be desirable to go as high as $t_1 = \frac{8}{10} t_2$, which means that the speed would have to be controlled within ±10%. These figures are intended only as a guide and not as a limitation on the ranges over which this invention may be exercised.

To additionally establish a maximum rate of acceptance, there may be included in the case of Figure 1 a gate in each photocell amplifier, together with a circuit arrangement which will close all the gates during the actuation interval of any of the pulse shaping multivibrators in any channel. Such a gating arrangement may also be employed in the case of Figure 3 to vigorously establish the maximum rate when pulses alternate between the two channels.

The circuit values in the monostable multivibrator 202 of Figure 6A and in any of the chain elements of Figures 1 and 3 have been here assumed, for the sake of simplicity and clarity of presentation, to be composed of fixed components, such that, once built, the values of $t_1$ and $t_2$ are substantially incapable of alteration. It is obvious to anyone skilled in the art that variable components may be substituted for fixed components so that the values of $t_1$ and $t_2$ are controllable either manually by the operator of the equipment or automatically according to some criterion. In the latter case $t_1$ and $t_2$ may be controlled by the actual film speed; if this be done, it is possible to achieve a very rigid discrimination as between wanted and unwanted patterns without adhering to as rigid a speed control as might otherwise be required.

Figure 7:
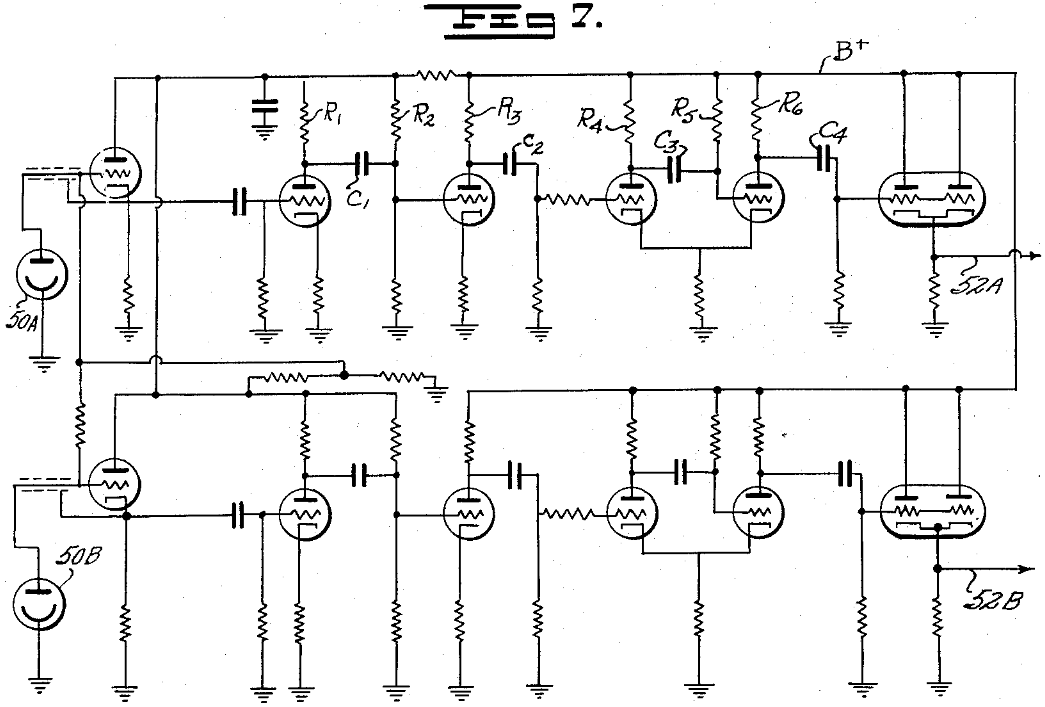
Figure 7 shows a detailed circuit.

For further illustration of my invention, I show in Figure 7 a detailed circuit layout which may be employed to generate the "spikes" of part *d* of Figure 6B. In other words, this is a circuit which fulfills the function of the series of blocks shown in Figure 6A. This circuit may be employed with either the system of Figure 1 or Figure 3, although in Figure 7, it is indicated that the photocells are 50A and 50B of the system of Figure 3. It is to be understood that the lower channel (of 50B) is identical to the upper channel (of 50A).

Figure 8:
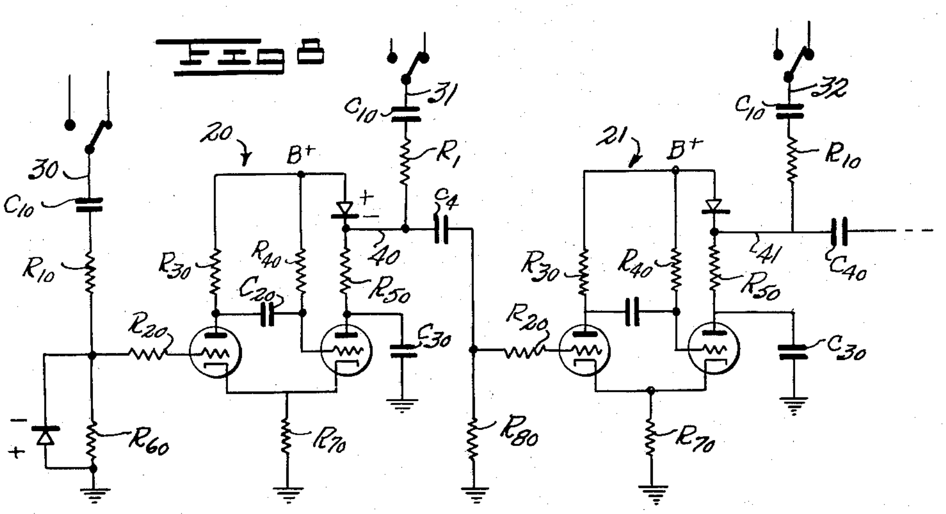
Figure 8 shows details of a multivibrator chain.

In Figure 8, I show the details of a portion of the multivibrator chain which is employed in the systems of both Figures 1 and 3.

The following table represents one combination of circuit parameters which I have successfully employed with a film such as that illustrated in Figure 9. With the centers of the successive code bars on the film spaced approximately $\frac{1}{60}$ inch apart, the minimum film speed using the following values is as low as 200 feet per minute, and the maximum speed is upwards of 400 feet per minute. Thus, a speed ratio of 2:1 is obviously established.

*Figure 7*

| | | |
|---|---|---|
| $C_1$—.001 mf. | $R_1$—27K | $R_5$—3.3 meg. |
| $C_2$—.02 mf. | $R_2$—4.7 meg. | $R_6$—10K |
| $C_3$—.0002 mf. | $R_3$—27K | |
| $C_4$—.0001 mf. | $R_4$—39K | |

$B^+$—250 v.

*Figure 8*

| | | |
|---|---|---|
| $C_{10}$—.002 mf. | $R_{10}$—22K | $R_{50}$—47K |
| $C_{20}$—.0002 mf. | $R_{20}$—33K | $R_{60}$—47K |
| $C_{30}$—.001 mf. | $R_{30}$—470K | $R_{70}$—8.2K |
| $C_{40}$—.002 mf. | $R_{40}$—5 meg. | $R_{80}$—330K |

$B^+$—250 v.

It will be understood that the foregoing values are given only as examples and are in no way to limit my invention.

It will be understood from the foregoing that many other record bearing mediums may be employed in place of transparent film. For example, the record may be placed on a continuous strip of paper or metal and the sensing accomplished by reflection of light from a reflecting surface rather than the transmission of light through a transmitting area. For example, a white tape may be adapted to receive black code marks. With such a tape, the white area will reflect light as the transparent areas of a film transmit light, and the black areas will not reflect just as the opaque areas of the film will not transmit. Thus, in either situation, a binary code may be established. It is, of course, also possible to employ a system of holes and sensing brushes to be used in place of a light sensitive system. Any system which will generate signals in sequence satisfies the basic requirement to actuate my chain arrangement of pulse forming circuits.

There are also obviously several other arrangements of the coded marks beyond those particularly described in the foregoing specification. For example, binary signals may be produced by the presence or absence of a code bar in one channel together with another code bar which is always present in a second channel. Still another method may involve the detection of the degree of "black-out" in which three degrees of black-out—partial black-out, clear film and total black-out—might be interpreted as zero, plus or minus signals, respectively. With the latter system only, a single light sensitive detective means would be required.

The foregoing methods and circuits are here presented only for the purposes of illustration and are not intended as limitations upon the invention, and the true scope of this invention is to be limited only by the scope of the appended claims.

I claim:

1. A selection system for use with a film bearing a pattern of code marks, comprising a plurality of light sensitive units arranged to scan non-collinear parallel paths, respectively, along the length of the film, a chain of pulse forming circuits, each circuit being arranged to produce a pulse of predetermined duration, each of the circuits except the first requiring the simultaneous existence of a primary and secondary input signal to produce an output pulse, the first circuit requiring only a primary input signal to produce an output pulse, the output of each of the circuits but the last in the chain being connected to serve as the secondary input to the next later circuit in the chain, the ouput of the last circuit being adapted for connection to a load, the circuits of the chain being adapted for connection to the light sensitive units in a predetermined order to correspond with a predetermined pattern of code marks of which selection is desired, whereby the light sensitive units will provide primary input signals to the circuits in a predetermined sequence which will permit an output pulse to be obtained from the last of the circuits in the chain.

2. In a selection system for use with a film bearing code patterns in the same paths with recorded information, light sensitive sensing devices adapted to scan non-collinear paths, respectively, along the film in which the code patterns appear, a chain of pulse forming circuits, each of the sensing devices being connected to a primary input of the pulse forming circuits, amplifier means in the connection between the light sensing devices and the pulse forming circuits to produce a pulse of short duration in response to marks sensed on the film, each of the circuits in the chain except the first requiring simultaneous existence of a primary and a secondary input signal to produce an output pulse, the first circuit requiring only a primary input signal to produce an output pulse, the output of each of the circuits except the last in the chain being connected to serve as the secondary input to the next later circuit in the chain, the output of the last circuit being adapted for connection to a load, the output pulse of each of the circuits of the chain being of a predetermined time duration, whereby a series of output pulses will flow from the beginning to the end of the chain only when the primary input pulses occur in such predetermined sequence that the latter co-exist with the output pulse of the next preceding circuit of the chain which is serving as the secondary input.

3. In a selection system for use with a film bearing binary code patterns in two channels in paths of the film which also contain recorded information, light sensitive devices arranged to scan the said two channels along the film as the film is moved relative to the sensing devices, the light sensitive devices being connected to monostable multivibrators adapted to produce an output pulse of relatively short duration each time a code mark of a given state appears in the channel, the output of the multivibrator being connected to a differentiating and clipping circuit whereby unidirectional spike signals are produced at the beginning of each of the multivibrator pulses, pulse forming circuits connected in a chain, all except the first of the circuits in the chain requiring both a primary and a secondary input signal to produce an output pulse and the output of all but the last of the circuits in the chain being connected to serve as a source of secondary input signals for the next following circuit of the chain, the light sensitive devices being connected through their respective spike forming circuits to serve as the source of primary input signals to predetermined pulse forming circuits of the chain, the output pulses of each of the circuits of the chain being of a predetermined duration, whereby as the film is moved within a predetermined speed range, the first of a series of code marks on the film may be connected to energize the first pulse forming circuit in the chain to produce an output pulse, and the next circuit in the chain may be connected to another of the light sensing devices which will provide a primary input signal to the said second circuit of the chain before the output pulse of the first circuit has decayed, the remainder of the circuits in the chain being connected to the light sensitive devices in such an arrangement that for a pre-selected code mark array on the film a pulse will flow the length of the chain and produce an output pulse from the last pulse forming circuit.

4. In a selection system for use with a film bearing binary code patterns in more than two non-collinear channels in parallel paths along the film which also contain recorded information, a light sensitive device arranged to scan respectively the channels along the film as the film is moved relative to the sensitive devices, pulse forming circuits connected in a chain, all except the first of the circuits in the chain requiring both a primary and a secondary input signal to produce an output pulse and the output of all but the last of the circuits in the chain being connected to serve as a source of secondary input signals with the next following circuit of the chain, the first circuit requiring only a primary signal to produce an output pulse and the output of the last being adapted for connection to a load the light sensitive devices being connected amplifying circuits to serve as the source of primary input signals to the pulse forming circuits in a predetermined order, the output pulses of each of the circuits of the chain being of a predetermined duration whereby as the film is moved within a predetermined speed range the first of a series of code marks on the film may be connected to energize the first pulse forming circuit in the chain by means of the light sensitive means connected thereto to produce an output pulse, and the next circuit in the chain may be connected to another of the light sensing devices to provide a primary input signal to the said second circuit of the chain before the output pulse of the first circuit has decayed, the remainder of the circuits in the chain being connected to the light sensitive devices in such an arrangement that for a pre-selected code mark array on the film a pulse will flow the length of the chain and produce an output pulse from the last of the said pulse forming circuits.

5. In a selection system, at least two light sensitive devices adapted to scan separate channels of a film on which are recorded in the channels code areas comprising a predetermined arrangement of complementary clear and opaque areas, each light sensitive device being connected to an amplifier to produce a signal when an opaque area intercepts light falling on the light sensitive device, a chain of single-shot multivibrators, the first multivibrator in the chain being connected to one of the said amplifiers and being adapted to produce an output pulse when a signal from the amplifier alone is received, the next multivibrator in the chain being connected to receive input signals jointly from one of the amplifiers and from the output of the preceding multivibrator in the said chain, the said next multivibrator in the chain requiring both input signals to exist simultaneously to produce an output signal, whereby an output signal may be obtained from the end of the chain only when the opaque areas on the film appear in a sequence which corresponds to an existing interconnection between the amplifiers and the multivibrators in the chain.

6. In a selection system, means for selecting groups of signals occurring in predetermined time sequence from other groups of signals occurring in other time sequences, said means comprising two light sensitive devices arranged to scan in non-collinear parallel paths respectively, along the length of a film bearing a pattern of code marks interposed among information markings, two or more units for producing output signals of self-limited time duration, each unit requiring a total input signal of predetermined level to produce an output signal, each unit being arranged to receive a first necessary part of its required input signal level from a predetermined one of the two light sensitive devices, the units being interconnected in a chain in which the output of all but the last unit is connected to provide a remaining necessary part of the required input signal level to the following unit in the chain, the output of the last unit being for connection to a load, the arrangement being such that only signals from the light sensitive devices occurring in said predetermined time sequence will provide the said first necessary parts of input to the chain units within the time periods of duration of the output signal of the preceding chain unit which provides the remaining necessary part of signal input to thereby eventually establish an output signal on the output of the last chain unit.

7. In a selection system for selecting areas along a record member, means for scanning non-collinear channels separately along the record member wherein appear code indicia and other indicia, means responsive to the scanning means for generating signals in response to the existence of said code indicia and said other indicia scanned on the member, and means for selecting groups of said signals generated in predetermined time sequence representative of code indicia from other groups of signals occurring in random time sequence in response to said other indicia, said selecting means comprising two or more units connected to the scanning means and each when otherwise enabled being responsive to the scanning means for producing output signals of self-limited time duration for each occurrence of signals generated by the scanning means connected thereto in response to said code indicia and other indicia, each unit being arranged to receive further enabling signals to be otherwise enabled so that a total input signal of predetermined amount produces an output signal for said self-limited time duration, the units being connected in a chain, the second and subsequent units in the chain being connected to receive said further enabling signals from the preceding unit in the chain, the last unit in the chain having an output for connection to a load, the arrangement being such that only signals occurring in time sequence predetermined by the arrangement of certain code indicia as distinguished from other code indicia and random indicia will provide the said necessary parts of input signal to the chain units within the time periods of duration of the output signal of the preceding chain unit which provides the remaining necessary part of signal input to thereby eventually establish an output signal on the output of the final chain unit.

8. A system as in claim 7 in which the first unit of the chain is arranged to be independently enabled to provide an output signal therefrom upon receiving only an input signal generated by the scanning means.

References Cited in the file of this patent

UNITED STATES PATENTS

| | | |
|---|---|---|
| 1,868,703 | Griffith | July 26, 1932 |
| 2,124,906 | Bryce | July 26, 1938 |
| 2,209,342 | Loughridge et al. | July 30, 1940 |
| 2,255,162 | Hart | Sept. 9, 1941 |
| 2,266,779 | Loughridge et al. | Dec. 23, 1941 |
| 2,272,366 | Dickinson | Feb. 10, 1942 |
| 2,295,000 | Morse | Sept. 8, 1942 |
| 2,337,553 | Hofgaard | Dec. 28, 1943 |
| 2,482,242 | Brustman | Sept. 20, 1949 |
| 2,497,936 | Finch | Feb. 21, 1950 |
| 2,540,654 | Cohen et al. | Feb. 6, 1951 |
| 2,594,358 | Shaw | Apr. 29, 1952 |

OTHER REFERENCES

Serial No. 321,161, Vieillard (A. P. C.), published May 25, 1943.